A. Goodman,
Turning Irregular Forms.

Nº 5,980.    Patented Dec. 19, 1848.

UNITED STATES PATENT OFFICE.

ALLEN GOODMAN, OF DANA, MASSACHUSETTS.

MACHINERY FOR TURNING IRREGULAR SHAPES.

Specification of Letters Patent No. 5,980, dated December 19, 1848.

*To all whom it may concern:*

Be it known that I, ALLEN GOODMAN, of Dana, in the county of Worcester and State of Massachusetts, have invented certain new and useful Improvements in Machinery for Turning Irregular Forms, of which the following is a full and exact description, reference being had to the annexed drawings of the same, making part of this specification, in which—

Figure 2:
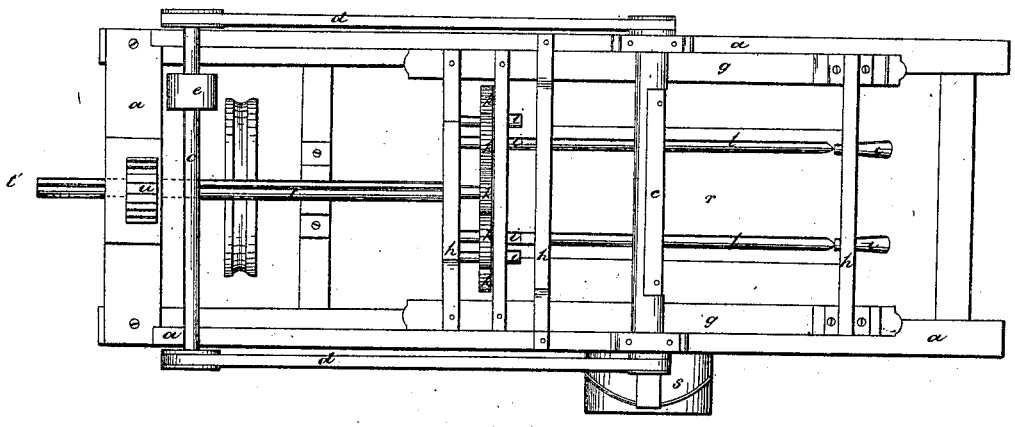
Figure 1:
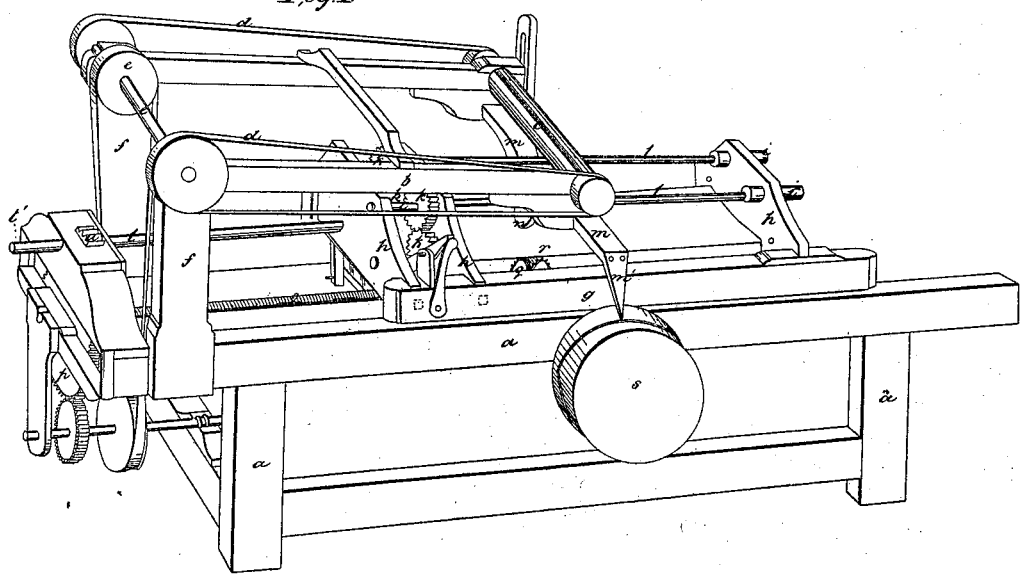

Figure 1 is a perspective view, showing the several parts in connection, Fig. 2 is a top view.

The same letters indicate the same parts in all the figures.

In the accompanying drawings $a$ represents the frame of the machine, made of any suitable material.

$b$ is a rising and falling swing frame, in which the revolving cutters $c$ are mounted, which are driven by the belt $d$ from the pulley $e$ which is secured upon the main driving shaft $e'$ which rests in bearings formed in the posts $f$.

The carriage $g$ is mounted upon ways on the top of the frame on which it slides, carrying the puppet heads ($h\ h$) to support the mandrels ($i\ i$) with their dead and live centers, and the cog wheels $k\ k\ k\ k\ k$ which drive them. Suspended between the centers are the pieces of timber $l, l$ to be dressed in to the proper form for spokes for carriage wheels as represented in the drawing, or any other form to which the governor $r$ may be adapted. The governor $r$ is a flat piece of board, or metal, with a cavity in its upper surface which is the exact counterpart of the shape of one half of the piece it is required to turn—a sort of intaglio engraving of it.

$m$ is a vibrating rest on which the swing frame is supported, it slides in mortises formed in the sides of the swing frame, and has a wheel $n$ on its under side on which it rests, this wheel traverses the surface of the governor from end to end, rising upon the elevated portions of it, and sinking into the depressions, and raises and lowers the swing frame and cutters which rest upon it, in a manner corresponding to that in which it is itself raised and lowered. The radius of the wheel $n$ must in all cases be less than the radius of the curvature of the depression in the top of the governor in order that it may enter into and roll upon the surface of the same, so as to raise and lower the cutters in such a manner that they may cut and shape the piece being turned of the form corresponding with the said depressions.

It will be seen from a consideration of the principles upon which this machine acts that the speed with which the piece of wood to be turned revolves, must bear a fixed relation to the number of vibrations of the rest and they are accordingly geared together, the shaft $o$ having the wheel $p$ which drives the machinery that turns the wood, mounted on one end, and the wheel $q$ which drives the mechanism which vibrates the rest, mounted on the other end. The shaft $o$ has a screw formed upon it which takes into a nut in the carriage to slide the same along the frame so as to bring the wood being turned throughout its entire length into contact with the cutter. Any number of pieces may be turned at the same time that can be revolved within the limits of the length of the cutter, and for each of which the necesary mandrels with their appendages are furnished.

The pulley $s$ has a spiral zig-zag groove on its periphery which is traversed by the arm $m'$ of the rest. This groove is of such a shape in this instance that it vibrates the rest across the governor once and back again during each revolution of the pulley and of the pieces being turned, because the latter have two flat sides, but if it were required to dress a piece with three or more sides, the guide groove in the pulley would have to be changed correspondingly to vibrate the rest of the required number of times. The eye of the wheel $u$ has a projecting piece or driver on its concave surface, which piece enters the groove $t'$ for the purpose of revolving the shaft $t$ and the wheels $k\ k\ k\ k\ k$ connected therewith.

To turn pieces of different sizes it is only necessary to change the position of the rest $m$ placing it nearer to or farther from the hinge of the swing frame.

It is obvious that the alternating motion of the rest $m$, and the rotary motion of the mandrels $i\ i$ together with the various subordinate movements may be produced by a great variety of contrivances known to mechanics, besides these herein described, and therefore the kind best suited to the circumstances of any given case, must be left to the selection of the constructor. And so also must the materials and proportions of the different parts.

It is obvious that the same results would be produced by causing the governor to alternate and preventing the rest from moving otherwise than up or down, or, both the rest and governor might alternate.

What I claim as my invention and desire to secure by Letters Patent, is—

The combination of the governor, with the vibrating rest, cutters, and mandrels, for the purpose of turning irregular forms, whether the same be constructed and arranged as herein described or in any other substantially similar manner.

In testimony whereof I have hereunto signed my name before two witnesses.

ALLEN GOODMAN.

Witnesses:
NATHL. JOHNSON,
THEODOCIA A. JOHNSON.